United States Patent [19]

Miller et al.

[11] Patent Number: 5,065,822
[45] Date of Patent: Nov. 19, 1991

[54] CROSSLINKING WATER SOLUBLE POLYMERS WITH IRON TO FORM GELS FOR USE IN SUBTERRANEAN PROFILE MODIFICATION

[75] Inventors: Edward E. Miller, Plano Collin, Tex.; Peter J. Strydom, Morriston, N.J.

[73] Assignee: American Cyanamid Company, Stamford, Conn.

[21] Appl. No.: 582,068

[22] Filed: Sep. 14, 1990

[51] Int. Cl.$^5$ .................. E21B 33/138; E02D 3/12
[52] U.S. Cl. .................. 166/295; 166/294; 166/300; 405/52; 405/154; 523/130; 523/132
[58] Field of Search .................. 166/294, 295, 300; 405/52, 154; 523/130, 132

[56] References Cited

U.S. PATENT DOCUMENTS

| | | | |
|---|---|---|---|
| 3,306,870 | 2/1967 | Eilers et al. | 166/295 X |
| 3,785,437 | 1/1974 | Clampitt et al. | 166/295 X |
| 3,926,258 | 12/1975 | Hessert et al. | 166/295 X |
| 3,978,928 | 9/1976 | Clampitt | 166/300 X |
| 4,018,286 | 4/1977 | Gall et al. | 166/294 X |
| 4,039,029 | 8/1977 | Gall | 166/294 |
| 4,825,949 | 5/1989 | Ryles et al. | 166/294 |

Primary Examiner—George A. Suchfield
Attorney, Agent, or Firm—Frank M. Van Riet

[57] ABSTRACT

A process of profile modifying permeable soils with an environmentally safe composition of a non-toxic water-soluble polymer, a redox couple of a water-soluble ferrous salt and a non-toxic, oxidizing agent which are mixed in water and pumped into a subterranean formation wherein ferrous ion is oxidized to ferric ion to gel the polymer making the subterranean formation impermeable.

9 Claims, No Drawings

CROSSLINKING WATER SOLUBLE POLYMERS WITH IRON TO FORM GELS FOR USE IN SUBTERRANEAN PROFILE MODIFICATION

BACKGROUND OF THE INVENTION

The present invention relates to a method of using a chemical grout wherein water-soluble polymers are crosslinked with iron to form a gel for sealing sewer pipe joints, soil stabilization, water proofing, controlling water flows, and profile modification of oil field producing and injection wells. Additionally, it relates to a chemical grout that will not expose workers or the environment to toxic chemicals such as acrylamide, chromium, or aluminum.

The idea of using mixtures of acrylamide and N,N-methylenebisacrylamide in aqueous solutions for the stabilization of soil was developed in the early 1950's. Reference is made to the U.S. Pat. Nos. 2,801,983; 2,801,984; 2,801,985; 2,868,753; 2,940,729; 3,056,757; 3,136,360; and 3,223,163. The technology consists of mixing acrylamide and methylenebisacrylamide in water and pumping them with a catalyst in separate lines to the point of application where they are mixed and a polymerization reaction takes place forming a crosslinked polymer gel in water. The reaction time is controlled by catalyst concentration and retarder. A major disadvantage with this type of grout is that acrylamide monomer is toxic and is environmentally detrimental to the underground water supply and to workers.

The toxicity of acrylamide monomer was eliminated by crosslinking water-soluble acrylamide polymer with metal ion, such as chromium by taking the metal at its highest valence state $Cr^{+6}$ and reducing it to $Cr^{+3}$ which crosslinks the polymer The gel time is controlled by the polymer concentration, temperature, and the choice or reducing agent. Another method of profile modification consists of injecting a slug of polymer into the formation followed by a chelated trivalent metal ion such as aluminum citrate followed by another polymer slug. While this procedure yields a strong grout, it presents the problem of the toxicity of the chromium ion which is an unacceptable contaminant in ground water and hazardous to workers.

The fact that ferric ion will crosslink water-soluble polymers in well known. It is taught in U.S. Pat. Nos. 4,825,949; 4,039,029; 4,018,286; 3,785,437 and 3,762,474. In these patents, iron is claimed to be used with a chelating agent, in its highest oxidative state and reduced to its lower oxidative state to crosslink the polymer In fact, iron will successfully crosslink acrylamide polymer only in its highest oxidative state $Fe^{+3}$ not the lowest $Fe^{+2}$. Furthermore, the crosslinking of water-soluble, acrylamide polymers with iron has always been uncontrollable making it impossible to place the gels where they are needed thereby necessitating the exclusive use of chromium and aluminum for crosslinking these water-soluble polymers. According to the present invention, iron is added to the polymer solution in its reduced form $Fe^{+2}$ such as ferrous chloride, ferrous ammonium sulfate etc. and in the presence of the polymer it is oxidized to ferric $Fe^{+3}$ ion which then crosslinks the polymer to form the gel. The reaction takes place at a pH of from about 2 to 9, but preferably between 3 and 7. The gel time is dependent, on the polymer concentration, the iron concentration, the temperature and the oxidizer. The amount of iron needed depends on the polymer used and the concentration of the polymer. Gels can be made using polyacrylamides, copolymers of acrylamide and acrylic acid, polyacrylates, modified cellulose polymers, polysaccharides, and copolymers of acrylic acid and 2-acrylamido-2-methylpropane sulfonic acid and the like.

The fast gel times that can be obtained by ferric ion crosslinking make it very well suited for subterranean profile modification.

It is therefore an object of this invention to provide an environmentally safe chemical grout that will not expose field workers to, nor contaminate ground water with, toxic monomers such as acrylamide monomer, or heavy metal ions such chromium Said grout is useful in sewer joint sealing, soil stabilization, water proofing and water flow control Furthermore, the grout is chemically stable and able to withstand contact with chemicals likely to be found in a sewer system such as acids, bases, oils, solvents, detergents and salts.

SUMMARY OF THE INVENTION

In accordance to the present invention, there is provided, in a method for altering the permeability of at least a portion of a subterranean formation wherein a fluid gelable composition is passed into the formation to a preselected location and the composition is gelled to modify the fluid flow profile of said portion of the formation, the improvement comprising using as the fluid gelable composition, a composition comprising: water; a water-thickening and cross-linkable amount of a water-dispersible polysaccharide or a water-soluble polymer consisting essentially of from about 3 to 100 mole percent of acrylic monomer units or salts thereof and from about 97 to 0 mole percent of different water-soluble monomer units or salts thereof and an amount of a polyvalent metal capable of cross-linking said polymer to form a stable gel, said polyvalent metal being provided in the form of a redox couple, said redox couple comprising at least one water-soluble ferrous reducing agent capable of being oxidized to a higher valence state and an oxidizing agent effective to oxidize ferrous ion to ferric ion. Said composition has been found to be environmentally safe as to not expose workers and underground water to toxic monomers or toxic heavy metals. The composition of polymers is crosslinked by the oxidation of ferrous ions to ferric ions to form a gel that is useful for sealing sewer pipe joints and fractures, soil stabilization, water proofing, controlling water flows, other uses of a chemical grout or for profile modification in oil field production and injection wells.

The water-soluble polymers are crosslinked with iron by oxidizing ferrous ion to ferric ion in a polymer solution to form a polymer gel in which the gel time and gel strength are controlled by the polymer concentration, ferrous ion concentration, the choice of oxidizer, and the oxidizer concentration. The polymer may be mixed with the crosslinking redox system on the ground surface and pumped down and placed in the desired section of the subterranean formation where the gelation is to occur. The ferrous ion may be dissolved in the polymer solution in one tank and the oxidizer dissolved in the polymer solution in another tank and the two solutions may be pumped in separate lines to the subterranean formation where are mixed in the area where the gelation occurs.

Other objectives and advantageous provided by the present invention well become apparent from the following detailed description of the invention and illustrative working examples.

DETAILED DESCRIPTION OF THE INVENTION

In accordance with the present invention, effective environmentally safe grout and soil profile modification is provided with a gelable, water-soluble or water-dispersible polysaccharide or copolymer or polymer made from about 3 to 100 mole percent of acrylic monomer unit or salts thereof and from about 97 to 0 mole percent of different water-soluble monomer or salts thereof. Examples of said polymers are polyacrylamide, copolymers of acrylamide and acrylic acid, (or similar polymers obtained by hydrolyzing polyacrylamide), copolymers of acrylamide and alkali metal salts of acrylic acid, polyacrylates, modified cellulose polymers, polysaccharides such as carboxymethyl cellulose, copolymers of acrylic acid or acrylic acid salts with comonomers e.g. acrylamide-2-methylpropanesulfonic acid or salts thereof and the like. The chelatable carboxyl groups of these polymers enables the crosslinking thereof with the ferric ion to produce stable gels. The gelable compositions of the present invention should be prepared using copolymers polymers or polysaccharides having a molecular weight, $M_w$, of from about 20,000 to about 20 million, preferably from about 200,000 to about 15 million. Polymer concentration of molecular weight within the range set forth above, will generally be from about 0.5% to about 15.0%, and preferably from about 0.5% to 10%, by weight, of the gelable composition.

In the present invention, iron is added to the polymer solution in its reduced form as a water-soluble ferrous salt such as a ferrous halide, ferrous sulfate, ferrous ammonium sulfate mixtures thereof and the like, in amounts sufficient to crosslink between 1 and 300% of the crosslinking sites available on the polymer. In the presence of the oxidizer, the ferrous salt is oxidized to the ferric ion $Fe^{+3}$ which then crosslinks the polymer to form the gel. The gel time is dependent on the polymer concentration, the iron concentration, the temperature and the oxidizer. The amount of iron needed depends on the polymer used and the concentration of the polymer.

A number of oxidizers react very fast with the ferrous ion forming gels of the polymer almost as fast as they are mixed. This group includes ammonium persulfate, potassium persulfate, sodium persulfate, hydrogen peroxide, potassium permanganate, sodium bromate, and ferric nitrate. Other oxidizers react more slowly forming gels in seconds to hours after mixing. This group includes sodium nitrate, sodium nitrite, sodium chlorate, and sodium hypochlorite. Mixing small amounts of fast oxidizers with the slow oxidizers results in intermediate gel times.

The fast gel times that can be obtained by ferric ion crosslinking make it very well suited for chemical grout. The polymer is pumped in a separate line to the point of application were the polymer is mixed with the ferrous compound and the oxidizer and gelation occurs. The gel time is controlled by the choice of oxidizer.

Gels used in profile modification of oil field producing and injection wells are mixed on the surface and pumped down the well where gelation occurs. The gel decreases the flow of water in the section of the formation where it is placed forcing water to enter other sections of the injection wells and in the producing wells the gel prevents water from entering the well thus cutting lifting cost and allowing more oil to be recovered. For these applications, a slow gel time is desirable and the gel time and gel strength are controlled by the polymer concentration, ferrous ion concentration, the choice of oxidizer, and the oxidizer concentration as can be determined by minimal testing.

The use of redox couples provides additional flexibility in handling and positioning of the gelable composition so that rigid gel formation can be effected in the desired location, e.g. the high permeability zones, of the subterranean formation. This is primarily because the time between mixing and the onset of gelation is generally proportional to the redox potential of the redox couple selected Therefore, by carefully selecting the oxidizing agent and reducing agent comprising the redox couple, the user can regulate the time involved prior to gel formation, such that it can be placed at any pre-determined location by regulation of the fluid flow rate of the carrier or delivery fluids.

The gelable compositions of the present invention may be employed as subterranean permeability agents in accordance with a number of contemplated methods For example, either the ferrous compound or the oxidizing agent can be first added to a solution of the copolymer or polysaccharide in water or other aqueous medium and then the other redox component added, or the ferrous containing compound and the oxidizing agent can be added simultaneously to a solution or an aqueous medium containing the copolymer or polysaccharide. Where convenient, the preferred method is to first disperse the copolymer in the water or other aqueous medium and then add the oxidizing agent to the dispersion with stirring. The ferrous containing compound is then added to the solution or aqueous medium containing the copolymer and the oxidizing agent, with stirring The newly formed ferric ions, effect rapid crosslinking of the copolymers and gelation of the solution or aqueous medium containing same.

Choosing oxidizers that will slowly oxidize ferrous ion to ferric is the key to controlling the gel time and allowing the gel to be placed subterraneously were it can be used. Examples 1 through 6 show the time being controlled in a chemical grout formulation. The polymer is a 20% solution of a 400,000 MW copolymer of 90 weight percent acrylamide and 10 weight percent acrylic acid.

The following working examples are provided by way of illustration only to enable those skilled in this art to better understand and practice the present invention.

| Example 1 | | | |
|---|---|---|---|
| Polymer | 90/acrylamide/10 acrylic acid | | 25 g |
| Water | | | 15 |
| Ferrous salt | 10% ferrous ammonium sulfate | | 5 |
| Oxidizer | 10% Sodium chlorate | | 5 |
| Total | | | 50 g |
| Gel Time | 8 min. 45 sec. | Weak Gel | |
| Example 2 | | | |
| Polymer | 90/acrylamide/10 acrylic acid | | 25 g |
| Water | | | 14.5 |
| Ferrous salt | 10% ferrous ammonium sulfate | | 5 |
| Oxidizer | 10% Sodium chlorate | | 5 |
| | 1% sodium bromate | | 5 |
| Total | | | 50 g |
| Gel Time | 1 min. 20 sec. | Medium Gel | |
| Example 3 | | | |
| Polymer | 90/acrylamide/10 acrylic acid | | 25 g |
| Water | | | 14.2 |
| Ferrous salt | 10% ferrous ammonium sulfate | | 5 |
| Oxidizer | 10% Sodium chlorate | | 5 |

| | -continued | |
|---|---|---|
| | 1% sodium bromate | 0.8 |
| Total | | 50 g |
| Gel Time | 45 sec. | Medium Gel |
| Example 4 | | |
| Polymer | 90/acrylamide/10 acrylic acid | 25 g |
| Water | | 14 |
| Ferrous salt | 10% ferrous ammonium sulfate | 5 |
| Oxidizer | 10% Sodium chlorate | 5 |
| | 1% sodium bromate | 1 |
| Total | | 50 g |
| Gel Time | 37 sec. | Medium Gel |
| Example 5 | | |
| Polymer | 90/acrylamide/10 acrylic acid | 25 g |
| Water | | 13 |
| Ferrous salt | 10% ferrous ammonium sulfate | 5 |
| Oxidizer | 10% Sodium chlorate | 5 |
| | 1% sodium bromate | 2 |
| Total | | 50 g |
| Gel Time | 7 sec. | Hard Gel |
| Example 6 | | |
| Polymer | 90/acrylamide/10 acrylic acid | 25 g |
| Water | | 15 |
| Ferrous salt | 10% ferrous ammonium sulfate | 5 |
| Oxidizer | 10% Sodium bromate | 2 |
| Total | | 50 g |
| Gel Time | instant gel | ringing gel |

After two hours all the gels in Examples 1–6 are ringing gels. The gels are excellent as a chemical grout for sealing sewer pipe joints. The gels form fast enough to allow short treatment times for the joints and a large enough range in gel times to treat large or small pipes.

Examples 7 and 8 are examples of gels used in profile modification in oil field producing and injection wells. The gel is mixed on the surface and pumped down the well where gelation occurs.

| Example 7 | | |
|---|---|---|
| Polymer | 90/acrylamide/10 acrylic acid | 6.25 g |
| Water | | 43.75 |
| Ferrous salt | 10% ferrous ammonium sulfate | 1.00 |
| Oxidizer | 10% Sodium nitrate | 1.00 |
| Total | | 50 g |
| Gel Time | 5 hr. very light gel/ medium gel overnight | |
| Example 8 | | |
| Polymer | 90/acrylamide/10 acrylic acid | 6.25 g |
| Water | | 44.25 |
| Ferrous salt | 10% ferrous ammonium sulfate | 1.00 |
| Oxidizer | 10% Sodium nitrate | 0.50 |
| Total | | 50 g |
| Gel Time | 5 hr. very light gel/ medium gel overnight | |

The gel times in Examples 7 and 8 are long enough to allow the polymer to be mixed on the surface and pumped into the formation before the gel sets up.

Examples 9 to 15 show other redox couples that fall within the scope of this invention.

| Example 9 | | |
|---|---|---|
| Polymer | 90/acrylamide/10 acrylic acid | 25 g |
| Water | | 25 |
| Ferrous salt | 10% ferrous ammonium sulfate | 2 |
| Oxidizer | 10% Sodium nitrate | 1 |
| Total | | 53 g |
| Gel Time | 15 sec. | Hard gel |
| Example 10 | | |
| Polymer | 90/acrylamide/10 acrylic acid | 25 g |
| Water | | 25 |
| Ferrous salt | 1% ferrous chloride | 5 |

| | -continued | |
|---|---|---|
| Oxidizer | IN Sodium nitrate | 5 |
| Total | | 60 g |
| Gel Time | 90 min. | Weak gel |
| Example 11 | | |
| Polymer | 90/acrylamide/10 acrylic acid | 6.25 g |
| Water | | 43.75 |
| Ferrous salt | 1% ferrous ammonium sulfate | 1.00 |
| Oxidizer | IN Sodium nitrate | 1.00 |
| Total | | 52 g |
| Gel Time | 15 min. | Medium Hard |
| Example 12 | | |
| Polymer | 90/acrylamide/10 acrylic acid | 25 g |
| Water | | 15 |
| Ferrous salt | 10% ferrous ammonium sulfate | 5 |
| Oxidizer | 3% hydrogen peroxide | 5 |
| Total | | 50 g |
| Gel Time | instant gel | |
| Example 13 | | |
| Polymer | 90/acrylamide/10 acrylic acid | 25 g |
| Water | | 19 |
| Ferrous salt | 10% ferrous ammonium sulfate | 5 |
| Oxidizer | 5.25% sodium hypochlorite | 1 |
| Total | | 50 g |
| Gel Time | 15 sec. | good gel |
| Example 14 | | |
| Polymer | 90/acrylamide/10 acrylic acid | 25 g |
| Water | | 17.5 |
| Ferrous salt | 2.5 ferrous chloride | 5 |
| Oxidizer | 10% sodium nitrate | 2.5 |
| Total | | 50 g |
| Gel Time | Instant, hard gel | |
| Example 15 | | |
| Polymer | 90/acrylamide/10 acrylic acid | 25 g |
| Water | | 25 |
| Ferrous salt | 10% ferrous ammonium sulfate | 2.75 |
| Oxidizer | 10% ammonium persulfate | 2.75 |
| Total | | 55.5 |
| Gel Time | Few seconds - good gel | |

The following examples demonstrate that a variety of oxidizing agents and various concentrations can be used to convert ferrous ion to ferric ion to induce gelation. The time of gelation may be varied from instant to over 5.0 hours for the gelation period.

| Example 16 | | |
|---|---|---|
| Polymer | 50% Polyacrylate (400,000 m.w.) | 10 |
| Ferrous salt | 20% ferrous ammonium sulfate | 30 |
| Oxidizer | 20% Sodium bromate | 4 |
| Total | | 44 |
| Gel Time | instant | Hard gel |
| Example 17 | | |
| Polymer | 10% sodium acrylate/50 2-acrylamido-2-methylpropane sulfate (2,000,000 m.w.) | 50 g |
| Ferrous salt | ferrous ammonium sulfate | 2.5 |
| Oxidizer | Sodium chlorate | 3 |
| | 1% sodium bromate | 2 |
| Total | | 57.5 g |
| Gel Time | 1 hour | Medium gel |
| Example 18 | | |
| Polymer | 1% nonionic polyacrylamide (15,000,000 m.w.) | 45 |
| Ferrous salt | 10% ferrous ammonium sulfate | 2.5 |
| Oxidizer | 10% Sodium chlorate | 2.5 |
| | .2% sodium bromate | |
| Total | | 50 g |
| Gel Time | overnight light gel | |
| Example 19 | | |
| Polymer | 1% Carboxymethyl cellulose | 50 g |
| Ferrous salt | 2% ferrous ammonium sulfate | 5 |
| Oxidizer | 2% ammonium persulfate | 5 |
| Total | | 60 g |
| Gel Time | 15 sec. | Medium gel |

-continued

Example 20

| | | | |
|---|---|---|---|
| Polymer | 1% Xanthan polysaccharide | 25 g | |
| Water | | 10 | |
| Ferrous salt | 10% ferrous ammonium sulfate | 5 | |
| Oxidizer | 10% Sodium chlorate | 5 | |
| | 0.1% Sodium bromate | 5 | |
| Total | | 50 g | |
| Gel Time | 2 min. | Hard gel | |

EXAMPLE 21

A one-mile section of sewer pipe is sealed using a 90 acrylamide/10 acrylic acid (400,000 mole weight), ferrous ammonium sulfate, and ammonium persulfate. The polymer concentration is about 7.5%. Ferrous ammonium sulfate and ammonium persulfate are added to give a 15 sec. gel time. The ferrous ammonium sulfate is added to the polymer in one tank while the ammonium persulfate was added to polymer in the other. The polymer solutions are pumped from the tanks in separate lines to the a pig where the polymer from both tanks mixes while being pumped into the pipe joint. The joint is tested before treatment by inflating the pig to seal the pipe. Air under pressure is pumped into the joint. If the joint can hold 6 psig of air pressure it is not treated. If the joint can not hold air pressure of 6 psig, polymer is pumped into the joint and allowed to set for 45 seconds. The joint is then retested with air pressure. Only three joints cannot be sealed with the polymer treatment. One is at a service entrance and another has a large root through the joint and the pig cannot seal the pipe.

Although the present invention has been described with reference to certain preferred embodiments, modifications or changes may be made therein by those skilled in the art. For example various polymers of polymer concentrations may be used. Different oxidizing agents or mixed oxidizing agents, or different concentrations of said oxidants or various temperature conditions may be used to control reaction rates and gel settling times. All such obvious modifications may be made herein, without departing from the scope and spirit of the present invention as defined in the appended claims.

As mentioned above, the process hereof is useful in the sealing of sewer pipe joints, soil stabilization, waterproofing, controlling water flows, profile modification of oil field producing and injection wells, salt water wells and the like to keep injection or produced fluids from escaping into the soil and/or groundwater or a seal a leak from oil or groundwater by forming a gel in the space between the pipes, tubings casings etc. and in the soil or groundwater around the leak.

We claim:

1. In a method for altering the permeability of at least a portion of a subterranean formation wherein a fluid gelable composition is passed into the formation to a preselected location and the composition is gelled to modify the fluid flow profile of said portion of the formation, the improvement comprising using as the fluid gelable composition a composition comprising:
   (a) water
   (b) a water-thickening and cross-linkable amount of a water-dispersible polysaccharide or a polymer consisting essentially of:
      (i) from about 3 to 100 mole percent of acrylic monomer units or salts thereof and
      (ii) from about 97 to 0 mole percent of other water-soluble monomer units or salts thereof and
   (c) an amount of a polyvalent metal capable of cross-linking said polymer to form a stable gel, said polyvalent metal being provided in the form of a redox couple, said redox couple comprising (iii) at least one water-soluble ferrous reducing agent capable of being oxidized to a higher valence state and (iv) an oxidizing agent effective to oxidize ferrous ion to ferric ion whereby said polyvalent metal is in situ produced in the form of ferric ion by oxidation of said reducing agent by said oxidizing agent.

2. A method according to claim 1 wherein the water-soluble polymer has a molecular weight of from about 20,000 to about 20,000.00.

3. A method according to claim 1 wherein the polymer is selected from the group polyacrylamide, copolymers of acrylamide and acrylic acid, copolymers of acrylamide and alkali metal salts of acrylic acid, polyacrylates, modified cellulose polymers, copolymers of acrylic acid or acrylic acid salts with acrylamido-2-methylpropanesulfonic acid or salts thereof and hydrolyzed polyacrylamide.

4. A method according to claim 1 wherein the ferrous salt is selected from ferrous halides, ferrous sulfate, and ferrous ammonium sulfate, in amounts sufficient to crosslink between 1 to 300% of the crosslinking sites available on the polymer.

5. A process method to claim 1 wherein the oxidizer is ammonium persulfate, sodium persulfate, potassium persulfate, an ammonium or alkali metal nitrate, an alkali akali metal nitrite, a alkali metal chlorate, an alkali metal bromate, alkali metal iodate, an alkali metal hyprochlorite, hydrogen peroxide or mixture thereof in amounts sufficient to fully oxidize the ferrous ion to ferric ion.

6. A method according to claim 1 wherein said polymer is mixed with the crosslinking system on the surface and placed in the desired section of the subterranean formation where gelation occurs.

7. A method according to claim 1 wherein the subterranean formation which is altered surrounds an oil well casing.

8. A method according to claim 1 wherein the subterranean formation which is altered surrounds a sewer pipe.

9. A method according to claim 1 wherein the subterranean formation which is altered surrounds an oil field injection well or salt water well.

* * * * *